(12) United States Patent
Sapuntzakis et al.

(10) Patent No.: US 8,589,918 B1
(45) Date of Patent: Nov. 19, 2013

(54) MULTI-PLATFORM COMPATIBLE PORTABLE VIRTUAL MACHINE PLAYER

(75) Inventors: Constantine P. Sapuntzakis, Mountain View, CA (US); Monica Sin-Ling Lam, Menlo Park, CA (US)

(73) Assignee: Moka5, Inc., Redwood City, CA (US)

( * ) Notice: Subject to any disclaimer, the term of this patent is extended or adjusted under 35 U.S.C. 154(b) by 1242 days.

(21) Appl. No.: 12/052,708

(22) Filed: Mar. 20, 2008

Related U.S. Application Data

(60) Provisional application No. 60/896,079, filed on Mar. 21, 2007.

(51) Int. Cl.
*G06F 9/455* (2006.01)
(52) U.S. Cl.
USPC .............................................. 718/1
(58) Field of Classification Search
None
See application file for complete search history.

(56) References Cited

U.S. PATENT DOCUMENTS

| | | | |
|---|---|---|---|
| 2002/0157001 A1* | 10/2002 | Huang et al. ................ | 713/2 |
| 2006/0101189 A1 | 5/2006 | Chandrasekaran et al. | |
| 2006/0277542 A1 | 12/2006 | Wipfel | |
| 2007/0006205 A1 | 1/2007 | Kennedy et al. | |
| 2007/0089111 A1 | 4/2007 | Robinson et al. | |
| 2007/0162521 A1 | 7/2007 | Raghunath | |
| 2007/0198713 A1 | 8/2007 | Tsao et al. | |
| 2008/0104588 A1 | 5/2008 | Barber et al. | |

FOREIGN PATENT DOCUMENTS

| | | |
|---|---|---|
| JP | 2006072591 A | 3/2006 |
| WO | 2006/036277 A2 | 4/2006 |
| WO | 2007/149671 A2 | 12/2007 |

OTHER PUBLICATIONS

Jack Lo, "VMware and CPU Virtualization Technology", 2005, VMworld2005.*
Bhardwaj et al., "A Choices Hypervisor on the ARM Architecture", Apr. 2006, University of Illinois.*
Internet Archive Wayback Machine, screenshot of archive search for "http://download3.vmware.com/vmworld/2005/pac346.pdf", retrieved Feb. 7, 2012 from http://www.archive.org/.*

* cited by examiner

*Primary Examiner* — Andrew Caldwell
*Assistant Examiner* — John Lindlof
(74) *Attorney, Agent, or Firm* — Park, Vaughan, Fleming & Dowler LLP

(57) ABSTRACT

Systems and methods for detecting, selecting and running environments on a host device is provided. In general, in one aspect, a computer implemented method is provided. The computer implemented method includes detecting a device including a plurality of platform specific virtual machine monitors, identifying a virtual machine monitor that is compatible with a specified platform; and enabling a launch of the identified virtual machine monitor on the specified platform. In another aspect, a computer implemented method includes detecting a first device including one or more environments, launching an application on a second device, and using the application to collect a list of stacks, collect a list of environments, and determine environments capable of running on a stack. The method further includes receiving a selection of an environment and a stack, and running the selected environment on the selected stack.

13 Claims, 5 Drawing Sheets

MULTI-PLATFORM COMPATIBLE PORTABLE VIRTUAL MACHINE PLAYER

CROSS REFERENCE TO RELATED APPLICATIONS

This application claims benefit under 35 U.S.C. §119(e) of U.S. Patent Application No. 60/896,079, filed Mar. 21, 2007, which is incorporated herein by reference.

TECHNICAL FIELD

This specification relates to detecting, selecting and running environments on a computer system.

BACKGROUND

A virtual machine (VM) is a software construct that appears to be hardware on which a guest operating system (OS) and applications can be installed. In an emulator implementation, the virtual machine is an emulator, simulating all of the hardware used by the guest operating system and applications. In para-virtualization, the virtual machine allows the guest operating system and applications to run on the host hardware, but requires that the guest operating system be modified to use a special API (application programming interface) to run on the virtual machine monitor. In machine-level or full virtualization, the virtual machine allows a guest operating system that is implemented for the underlying host processor to be run without modification.

In a para-virtualization or a machine-level virtualization implementation, a virtual machine monitor (VMM) is used to bind the virtual machine to the underlying host hardware. In some architectures, the virtual machine monitor runs directly on the host hardware, in a hypervisor configuration. In others, it runs as an application on the host operating system. In some architectures, a lightweight hypervisor is run between the host operating system and the host hardware that provides a calling interface for both the host operating system and the virtual machine monitors. In some architectures, a hypervisor uses the services of a host operating system for device and other support.

Users would like to move software and data between devices. One way to do this is to place the software and data inside a VM and put the VM and VMM software on a portable storage media (e.g., a Universal Serial Bus (USB) drive or other portable storage media), which can be removably coupled to the device. Conventional approaches, however, are directed to a single VMM, which can only run on one type of operating system (e.g., Windows® XP).

Additionally, operating-system or application-level virtualization, which generally virtualize at the operating-system API boundary, can be faster and less memory and CPU intensive than full virtual machine virtualization. However, operating-system or application-level virtualization are not as portable as they require a compatible operating system at the host being visited.

SUMMARY

In general, in one aspect, a computer-implemented method is provided. The computer-implemented method includes detecting device including a number of platform-specific virtual machine monitors, identifying a virtual machine monitor that is compatible with a specified platform, and enabling a launch of the identified virtual machine monitor on the specified platform.

Embodiments of this aspect can include apparatus, systems and computer-program products.

Implementations of the method, computer-program product and system can optionally include one or more of the following features. The step of enabling a launch can include presenting a representation of the identified virtual machine monitor to a user; and receiving user input for launching the virtual machine monitor.

In general, in another aspect, a second computer-implemented method is provided. The computer-implemented method includes detecting a first device, the first device including one or more environments; launching an application on a second device; using the application to collect a list of one or more stacks, the one or more stacks on the list being located on either the first device or on the second device, and being capable of running on the second device; using the application to collect a list of all environments located on either the first device or on the second device; using the application to determine which environments are capable of running on a stack from the list of one or more stacks; receiving a selection of an environment capable of running on a stack from the list of one or more stacks; receiving a selection of a stack from the list of one or more stacks; and running the selected environment on the selected stack.

Embodiments of this aspect can include apparatus, systems and computer program products.

Implementations of the method, computer program product and system can optionally include one or more of the following features. The step of receiving a selection of a stack can include the application automatically selecting a stack and then collecting a list of all environments capable of running on the selected stack. The first device is a portable device and the second device is a host device. Additionally, the stacks can include VMM stacks and OS API stacks. Additionally, when a VMM stack is selected, a VM can mount the selected environment.

In general, in another aspect, a third computer implemented method is provided. The computer implemented method includes running one or more environments located on a device, each environment being operable to run on two or more stacks located on the device, the two or more stacks including at least one bootable stack and at least one non-bootable stack.

Embodiments of this aspect can include apparatus, systems and computer program products.

Implementations of the method, computer program product and system can optionally include one or more of the following features. The device is a peripheral device.

Particular embodiments of the subject matter described in this specification can be implemented to realize on or more of the following advantages. A hardware-level virtual machine can be introduced to run a compatible operating system (OS), for maximum compatibility. For example, if the host contains an operating system compatible with the OS/API-level virtualization layer, then the system may run just the layer on the OS and the virtualized software on top of the layer. If the host runs an incompatible operating system, the system may run a virtual machine monitor which runs a VM with a compatible host operating system, which then runs virtualization layer and ultimately the virtualized software. Additionally, by running the software in a VM, the host is assured that the virtualized software will not interfere with host's operation.

DETAILED DESCRIPTION

The disclosed implementations allow software applications and/or data stored on a single, peripheral device (e.g., a portable storage media), to be used on multiple, incompatible platforms (e.g., devices with different native operating systems (OSs)). In some implementations, this can be accomplished by bundling multiple VMMs onto a peripheral device, coupling the peripheral device to a host device, and automatically launching a compatible VMM monitor on the host device. In other implementations, a VMM representation (e.g., icon), can be presented to the user to select and launch a compatible VMM monitor on the host device. As used herein, the term "compatible" means compatible with the native host OS.

Figure 1:
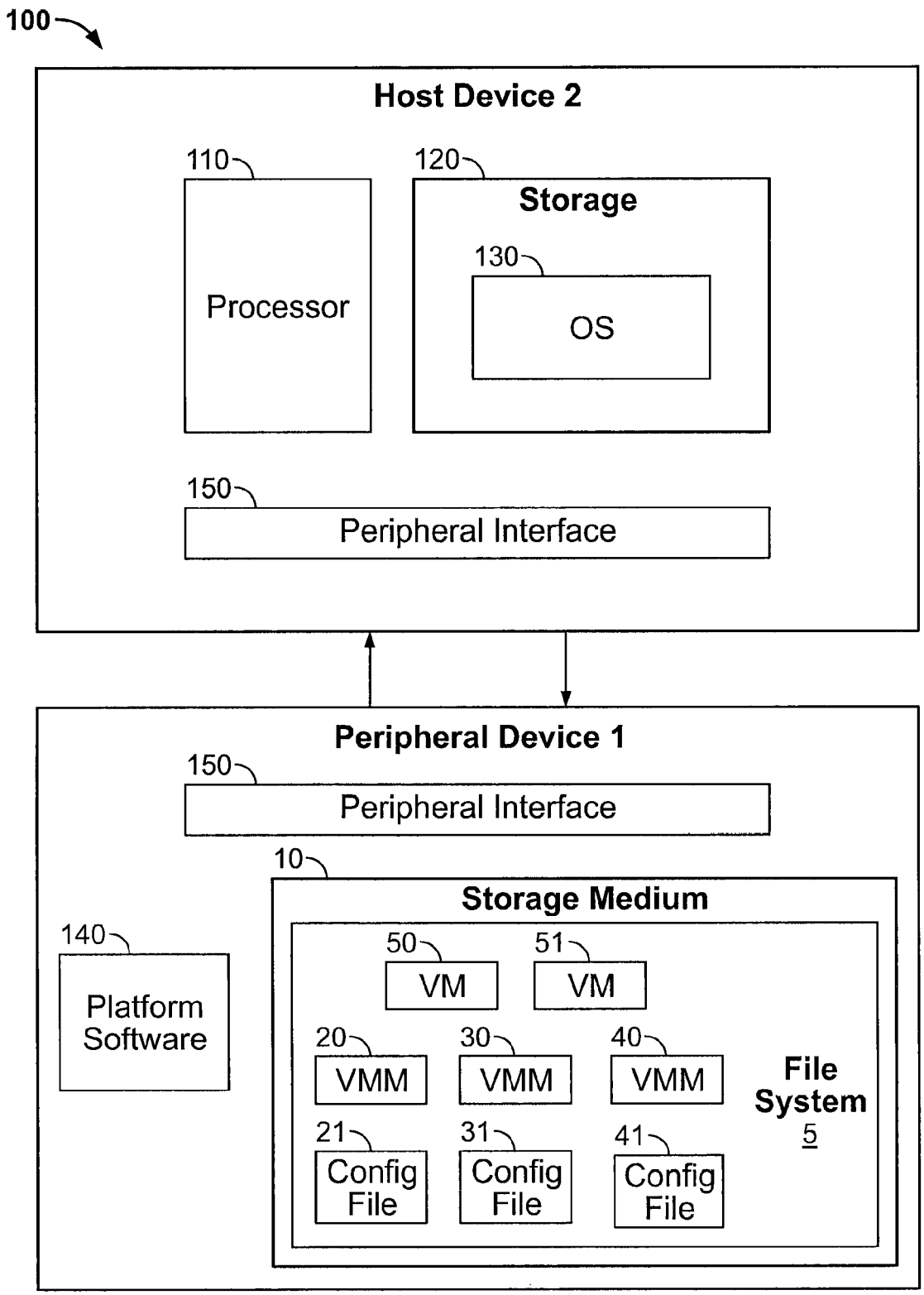
FIG. 1 illustrates an example configuration for a system including a multi-platform compatible peripheral device.

FIG. 1 illustrates an example configuration 100 for a system including a multi-platform compatible peripheral device. Peripheral device 1 can be any device having a storage medium (e.g., storage medium 10 which can be a for example, a USB flash drive, a CD ROM, a DVD, an SD card, a memory stick, a portable hard drive, a media player/recorder, or an external hard disk) that is accessible by a host device (e.g., host device 2). In some implementations, peripheral device 1 can be a multi-platform compatible VM player architecture (e.g., a portable VM player), and can include a removable storage media 10. Peripheral device 1 can include platform software 140 (e.g., a LivePC™ Engine like that manufactured and distributed by Moka5 of Redwood City, Calif.).

Peripheral device 1 can be any device capable of communicating with another device. In some implementations, peripheral device 1 (e.g., multi-platform compatible VM player) can be coupled to host device 2 (e.g., computer, mobile phone, game console, set-top box, etc.). To facilitate coupling with host device 2, peripheral device 1 can include a connector or wireless transceiver (e.g., Firewire, Ethernet, USB interface, or USB wireless interface), that allows the peripheral device 1 to interface with host device 2. For example, peripheral device 1 can include a peripheral interface connector 150. The peripheral interface connector 150 can be operable for coupling to a host device 2 and capable of supporting data transfers to and from host device 2.

Examples of peripheral devices, can include, but are not limited to portable storage devices, game controllers, headsets, webcams, optical media drives, musical instruments, keyboards, mice, microphones, television tuners, digital cameras, video cameras, stereo receivers, audio receivers, cellular phones (and any other device utilizing cellular technology), scanners, headphones, printers, personal health monitors (and any other health related monitoring apparatus), and PIN pads.

In some implementations, the storage medium 10 in peripheral device 1 can contain one or more VMs. A VM can include an operating environment, application software (e.g., peripheral device specific software), configuration settings, user data, code, libraries, or device drivers capable of providing the user with the ability to use the device for a particular use case. A different VM can exist and be run on each host device based on the host device architecture (e.g., a cell phone version of the VM for a cell phone architecture or personal computer version of the VM for a personal computer architecture).

Host device 2, can be any device capable of communicating with another device such as peripheral device 1. Examples of a host device can include, but are not limited to, personal computers, personal digital assistants, cellular telephones, media player/recorder, television set-top box, game console, and tablets. Host device 2 can include a peripheral interface connector 150 or wireless transceiver (e.g., Firewire, Ethernet, USB interface, or USB wireless interface), capable of supporting data transfers to and from peripheral device 1. Host device 2 can also include system software (e.g., Windows XP or modern PC BIOS), capable of accessing data storage exposed over the peripheral interface 150.

In some implementations, host device 2 can include software that can automatically launch (e.g., by default), a designated or selected (e.g., by the system or the user) computer program (e.g., Windows XP autorun function), from peripheral device storage 10. Additionally, in some implementations, host device 2 can include a network connection (e.g., DSL, cable, dialup, LAN, VPN, cellular, or WiFi), to enable features of the platform software 140 (e.g., acquiring updates, acquiring remote user data, or exposing device functionalities to other devices accessible using the network connection).

Host device 2 can also include a processor 110 (e.g., an x86 processor in a Dell® computer) and one of more user input devices (e.g., a keyboard, mouse, or touchpad). The processor 110 can be coupled to the peripheral interface 150 and the processor 110 can be operable to run a native environment. Host device 2 can include a storage 120 for storing instructions which when executed by the processor 110 cause the processor 110 to perform certain operations (e.g., launching a virtual machine monitor). The storage 120 in host device 2 can also include an operating system 130. In some implementations, the platform software 140 to run a virtual machine (e.g., a virtual machine monitor), can be pre-installed on host device 2. In some implementations, the platform software 140 can include components (e.g., code), capable of checking (e.g., scanning) host device 2 (e.g., for host device characteristics and capabilities), and selecting available software (e.g., a VM environment) on peripheral device 1 that is compatible with host device 2.

Referring to FIG. 1, the storage medium 10 on peripheral device 1 includes one or more VMMs (e.g., VMMs 20, 30, and 40), one or more configuration files (e.g., configuration files 21, 31, and 41), and one or more VMs (VMs 50 and 51). In some implementations, storage medium 10 contains a file system 5 containing one or more of the VMMs 20, 30, and 40, along with the corresponding program files and settings for one or more of the VMMs 20, 30, or 40. The file system 5 can also contain one or more of the VMs 50 or 51. The VMs 50 and 51 can contain the programs, settings, and data of the user. In some implementations, storage medium 10 can contain more than one file system 5, as will be discussed in greater detail below with respect to the multiple partitions in FIG. 5.

The configuration files 21, 31, 41 can be interpreted by the OS 130 of the host device 2, so that when the user attaches the peripheral device 1 containing storage medium 10 to host device 2, a VMM that is compatible with the host device 2 (e.g., VMM 20, 30, or 40), is automatically launched and/or highlighted in a user interface or other display of the device, allowing the user to select and/or launch a compatible VMM. For example, a host OS can look for specific files (e.g., specific filenames or extensions), in order to use the peripheral device 1 or to control the presentation of the VMMs 20, 30, or 40. In some implementations, different types of operating systems can look for different files.

In some implementations, when the VMMs 20, 30, 40 (e.g., QEMU for Windows® and QEMU for Mac OS X®), are installed onto a peripheral device 1, one or more configuration files (e.g., one for each platform), are created for instructing the host OS to identify a compatible VMM on the storage media 10, and to present an icon (or other user interface element), to the user that corresponds to a compatible VMM. The icon (or other user interface element), can be prominently or conspicuously presented to the user. For example, a large icon can be presented in a window or other display that identifies a compatible VMM, while icons for incompatible VMMs can be hidden from the user. In some implementations, on Windows®, an autorun.inf file can be used to automatically run a Windows® compatible VMM on the host device, or to add a launch instruction to a list of potential actions that are related to peripheral device 1 and that can be performed by the host OS. The format for a Windows autorun.inf file can be found in publicly available documents provided by Microsoft Corporation (Redmond, Wash.). A sample autorun.inf file can include the following instructions:
[autorun]
action=Run Virtual Machines
ShellExecute=win-launcher.exe
icon=.\win-launcher.ico
includeRuntimeComponents=True.
The Windows®, an autorun.inf file will be discussed in greater detail below with respect to FIG. 5.

In some implementations on Mac OS X®, one or more files (e.g., a hidden .DS_Store file), can be used to control the presentation of a folder or other element on peripheral device 1 in the Finder. For example, a large icon for the Mac OS-compatible VMM can be placed in the folder, and optionally highlighted by a background that identifies the Mac OS-compatible VMM. The one or more files can be created by changing the background and icon positions in a folder in the Finder such that it is apparent to the user which icon the author wishes the user to click on. A copy of the hidden files can then be saved in that directory or in another storage location. VMMs that are compatible with other platforms can be similarly implemented as described above.

Figure 2:
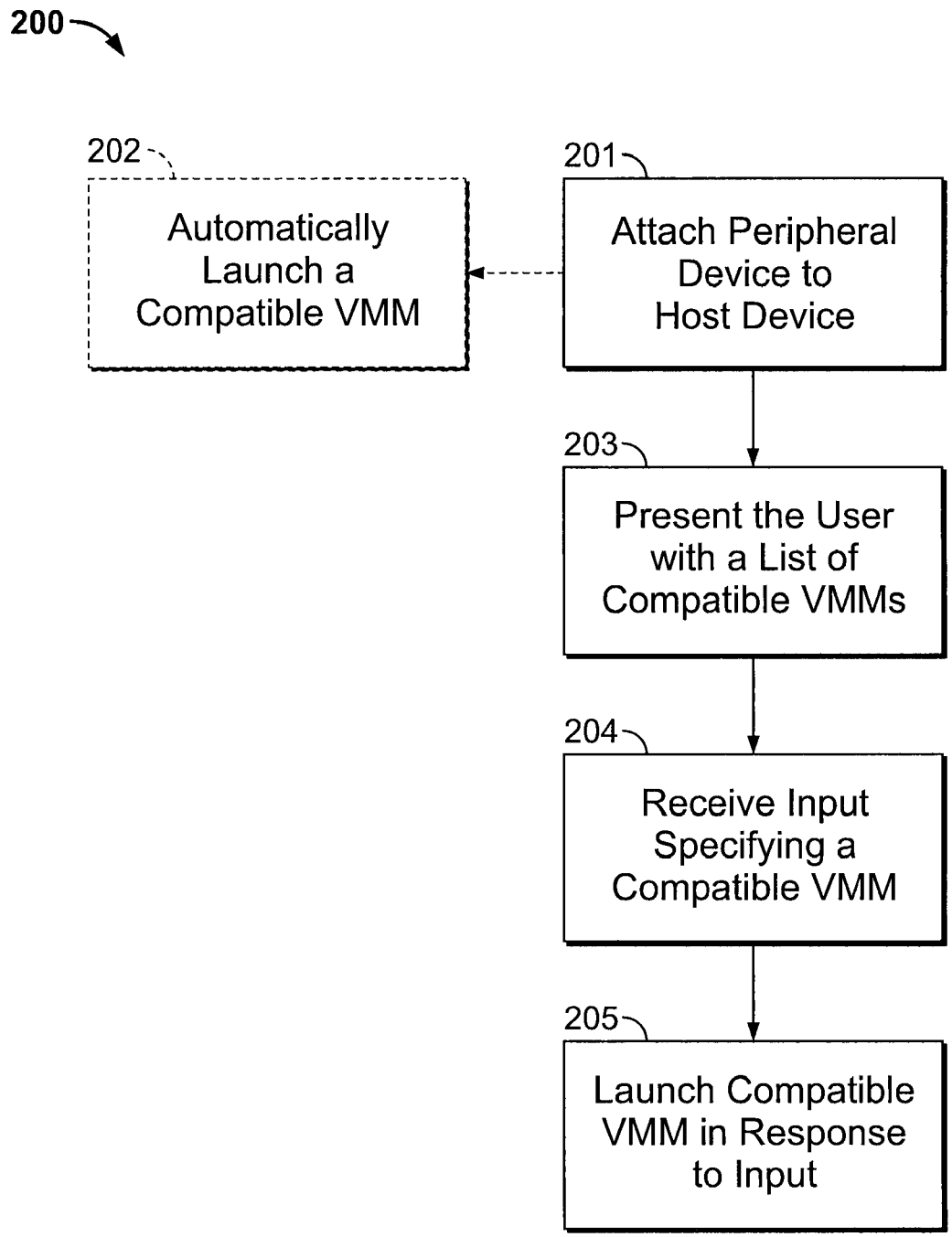
FIG. 2 is a flow diagram showing an example process for implementing a multi-platform compatible, portable VM player architecture.

FIG. 2 is a flow diagram showing an example process 200 for implementing a multi-platform compatible, portable VM player architecture. In some implementations, a user attaches 201 a peripheral device 1 (e.g., a portable storage medium including a plurality of platform-specific VMMs), to a host device. After the peripheral device 1 is attached to the host device, the host device can detect the presence of the peripheral device 1. The host device can then identify and launch one or more platform-specific VMMs that are compatible with an identified platform (e.g., the platform of the host device). In some implementations, (e.g., on a Windows® host device), the system can automatically launch 202 a compatible VMM.

Alternatively, in some implementations (e.g., on a Windows® host device), the system can automatically launch and present 203 to the user a user interface which can include a window displaying a list of compatible VMMs for Windows®. Alternatively, the user can be presented with a user interface or a window containing a list of options for operating the host device (e.g., the option of launching a Windows® compatible VMM). In some implementations, input is received 204 from the user specifying a compatible VMM. For example, the list of options for operating the host device can include one or more icons corresponding to VMMs that are compatible with the host OS. The user can click on an icon (or other user interface element), in the list of options corresponding to a compatible VMM to initiate a launch of the compatible VMM. The compatible VMM is then launched 205 in response to the received user input.

On a Mac OS X® host device, when a peripheral device 1 is attached to a host device, an icon representing the peripheral device can appear (e.g., on the user's desktop in a folder representing the storage on the peripheral device). User input can then be received (e.g., the user can click on the icon related to the peripheral device 1 attached to the host device). Clicking on the icon can cause one or more other icons representing VMMs on the peripheral device 1 that are compatible with the Mac OS X® host device to appear. The user can then launch the compatible VMM (e.g., by clicking on an icon representing a compatible VMM).

Figure 3:
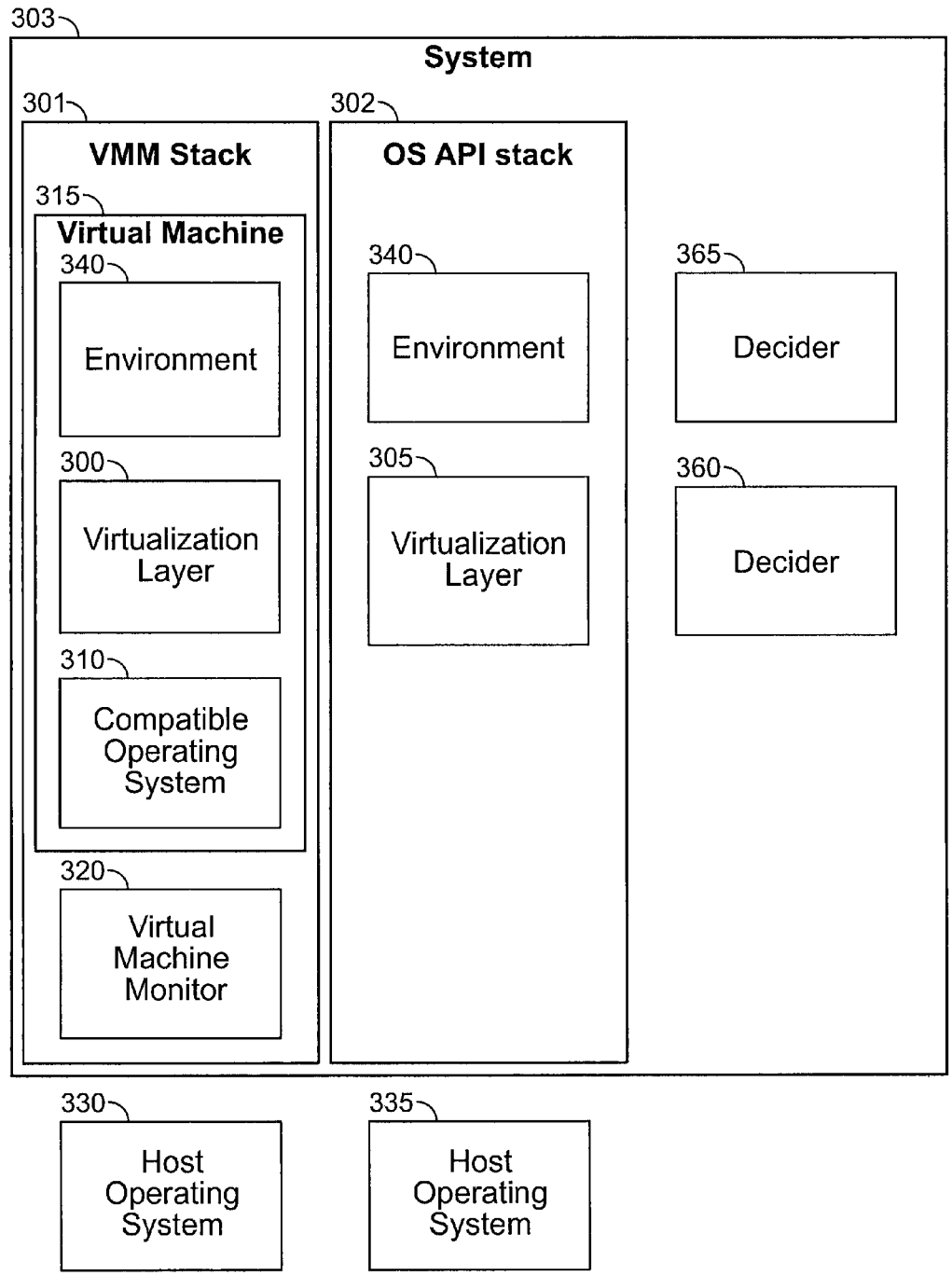
FIG. 3 illustrates an example system including one or more multi-platform compatible environments.
Figure 4:
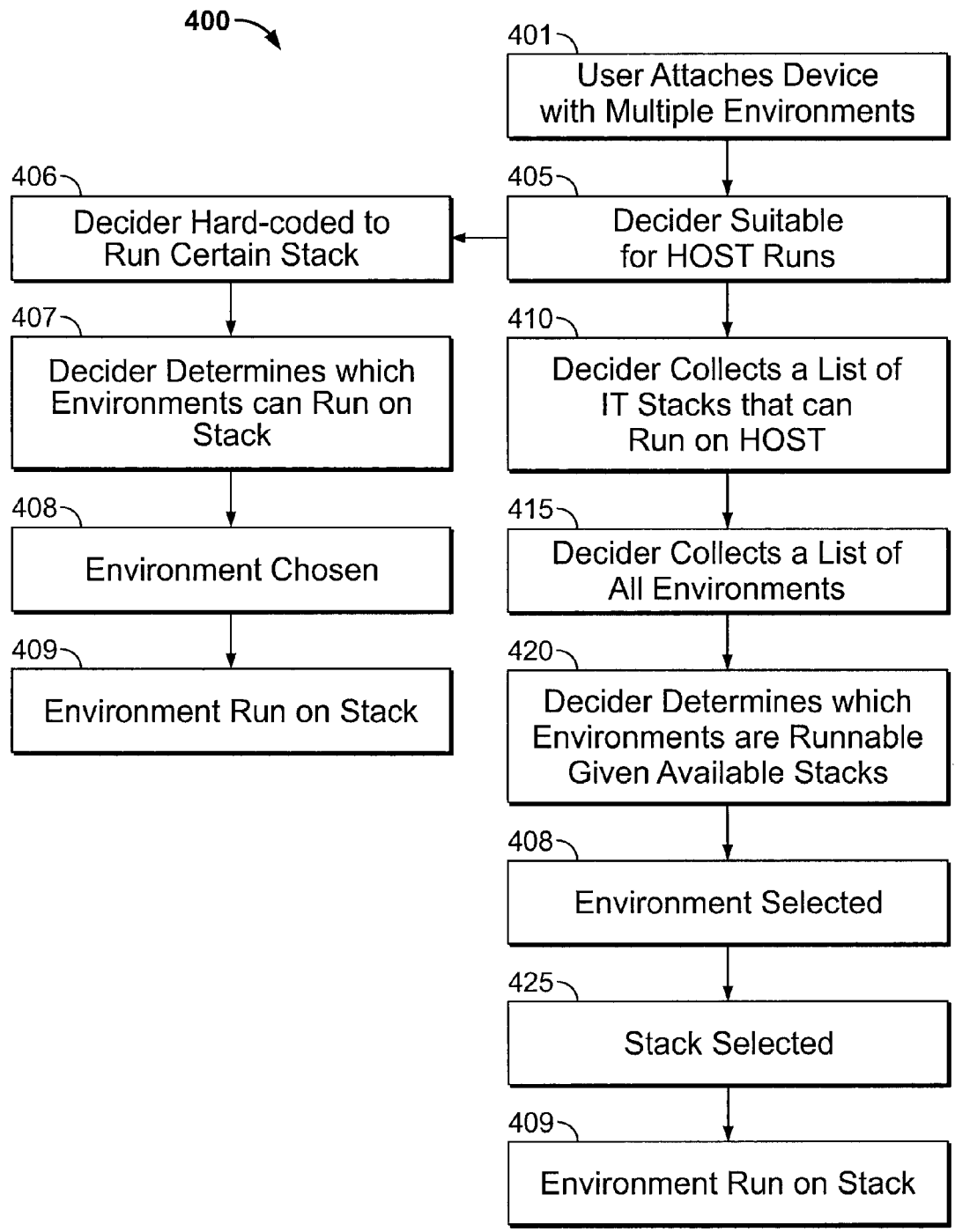
FIG. 4 shows a flowchart of an example method for selecting and running a multi-platform compatible environment on a host device.

FIG. 4 shows a flowchart of an example method 400 for selecting and running a multi-platform compatible, environment 340 on a host device. FIG. 3 illustrates an example system 303 including one or more multi-platform compatible, environments 340. The one or more environments 340 can be portable such that they can be transferred between devices.

The method 400 begins when a peripheral device including one or more environments 340, is attached 401 to a host device. When the peripheral device is attached 401 to the host device, the host device will detect the presence of the peripheral device, and the host device can automatically launch an application such as deciders 360 or 365. For example, the host device can launch an application (e.g., deciders 360 and 365), if the application is suitable to run 405 on the host device (e.g., compatible with the host device OS). In some implementations, the system can present an icon to the user (e.g., an icon representing a peripheral device which contains system 303). The user can interact with the icon (e.g., click on or roll over the icon), which can cause the system on the host device to run 405 an application (e.g., a decider suitable to run on the host device). Deciders 360 and 365 are software that can determine which stack to use (e.g., an OS API stack 302 or a VMM stack 301), when the decider 360 or 365 is automatically launched or when an indication is made (e.g., by the user), to start an environment 340 on the host device.

The OS API stack 302 can include a virtualization layer 305, and environment 340®. An OS API stack 302 compatible with the host OS 335 can run on host OS 335. The host operating system 335 can be any operating system (e.g., Microsoft Windows XP/Vista®, Windows CE®, Linux, or Mac OS X®), capable of supporting a virtualization layer. The virtualization layer 305 can be any OS API level virtualization layer (e.g., Mojopac, Ceedo, Thinstall, Altris SVS, SWSoft Virtuozzo, and Microsoft Softricity®), that is compatible with host operating system 335. The environment 340 can be any application, system software, or software environment supported by the virtualization layer 305. The environment 340 can include several applications. The environment 340 can run on top of virtualization layer 305. The environment 340 can use functionalities exposed by the virtualization layer 305 (e.g. those simulating an isolated or distinct OS instance). If the applications in the environment 340 are already written to be portable (e.g., Firefox™ or any portable environment found at www.portableapps.com), then the virtualization layer 305 may not be needed and the applications can run directly on top of a host operating system 335 or compatible operating system 310. After a peripheral device is attached to a host device, in some implementations, the environment can run on the host device and from the peripheral device without installing anything into the host device registry or file system.

The VMM stack 301 can include a virtual machine 315 and a virtual machine monitor 320. A VMM stack 301 compatible with the host OS 330 can run on host OS 330. The host OS 330 can be any host operating system (Microsoft Windows XP/Vista®, Windows CE®, Linux, or Mac OS X®), that supports VMM virtualization. The virtual machine 315 can include a compatible operating system 310 (e.g., any operating system that runs inside a VMM, such as Microsoft Windows XP/Vista®, Windows CE®, Linux, Mac OS X®), a virtualization layer 300, and an environment 340. The virtualization layer 300 can be the same software as virtualization layer 305 or it can be different software that is compatible with the host OS 330. In some implementations, parts of the virtualization layer 300 and 305 are stored in the same files on system 303. The VMM 320 is any virtual machine monitor software (VMware Player, Parallels Client, and KVM), capable of running compatible operating system 310. As noted above, in some implementations, virtualization layer 300 is not needed if the applications in environment 340 are portable and can run directly on compatible operating system 310.

The system 303 can contain multiple deciders (e.g., deciders 360 and 365). A decider can be coded to run on a specific host operating systems. For example, decider 360 can be coded to run on host OS 330, and decider 365 can be coded to run on host OS 335. System 303 can include one or more VMM host stacks 301 and one or more OS API stacks 302. In some implementations, system 303 is stored on a peripheral device (e.g., mobile storage device). In some implementations, system 303 is stored on the host device. In some implementations, one or more VMMs (e.g., VMM 320), can be stored on the peripheral device or on the host device, or on both. In some implementations, one or more virtualization layers 305 can be stored on the peripheral device or on the host device, or on both. In some implementations, one or more deciders 360 can be stored on the peripheral device or on the host device (e.g., pre-installed on the host device), or on both. In some implementations, one or more virtual machines 315 without an environment 340, can be stored on the peripheral device or on the host device, or on both.

In some implementations, the decider 360 can examine the OS on the host device to determine whether the OS on the host device is compatible with a particular virtualization layer (e.g., virtualization layer 305). In some implementations, the decider 360 can examine the OS on the host device to determine whether the OS on the host device will allow a particular virtualization layer (e.g., virtualization layer 305), to run on the host device. If the decider 360 determines that no available virtualization layers will be allowed to run on the host device, the decider 360 can indicate an error to the initiator (e.g., the user).

In some implementations, the decider 360 can examine the OS on the host device to determine whether the OS on the host device will allow a particular VMM (e.g., virtual machine monitor 320), to run on the host device. In some implementations, the decider 360 can examine the OS on the host device to determine whether a compatible VMM (e.g., virtual machine monitor 320), already exists on the host device. If the decider 360 determines that no available VMMs are compatible with the OS on the host device, the decider 360 can indicate an error (e.g., to the user). In other implementations, if the decider 360 determines that no available VMMs are compatible with the OS on the host device, the decider 360 can search (e.g., the Internet), for a VMM compatible with the OS on the host device. If the decider 360 locates a compatible VMM, the decider 360 can download the compatible VMM and run it on the host device.

In some implementations, the decider 360 is hard-coded 406 to run a particular type of stack on the host device. For example, the decider 360 can be hard-coded 406 to recognize that the environment 340 is Windows-only but the decider 360 is a Mac OS X® application (e.g., the decider 360 can be wired to run a Mac OS X® compatible VMM stack). In these implementations, the decider 360 can determine 407 which available environments can run on the particular type of stack (e.g., the Mac OS X® compatible VMM stack), and automatically choose 408 a particular environment to run 409 on the particular stack. For example, the decider 360 can automatically choose the only available environment or the decider 360 can automatically choose an environment previously chosen one or more times by the user.

In some implementations, a decider 360 or 365 can first examine an environment to see whether a compatible stack exists on the host device or the peripheral device. In some implementations, a decider (e.g., decider 360 or 365) can present an environment to the user as a selectable environment. In some implementations, a decider 360 can indicate a selection of available environments to the user. The user can then choose 408 a particular available environment to run on the particular stack. Once the user chooses an environment, the chosen environment is run 409 on the particular stack. In some implementations, an environment can automatically run on the host device after the peripheral device is attached to the host device (e.g., if the environment is the only environment on the peripheral device).

In some implementations, the decider collects 410 a list of one or more available stacks (e.g., on the peripheral device, the host device, or both), capable of running on the host device. Additionally, the decider can collect 415 a list of one or more available environments (e.g., on the peripheral device, the host device, or both), capable of running on the host device. In some implementations, based on the list of one or more available stacks and the list of one or more available environments, the decider can determine 420 which environments can run given the available stacks. In some implementations, a single environment can run on several different stacks depending on how the environment needs to be run. For example, with a Windows portable environment, one may have the option of using both OS-level and VMM-level virtualization to run the Windows® portable environment. The user can then choose VMM-level virtualization to run the Windows® portable environment (e.g., for more compatibility or security). Additionally, the user can choose OS-level virtualization (e.g., to run the Windows portable environment for faster startup and better integration).

After the decider determines 420 which environments can run given the available stacks, an environment can be chosen. In these implementations, the decider 360 can automatically choose 408 a particular environment to run 409 on an available stack. In some implementations, a decider 360 can indicate (e.g., using colors or shading), to the user, a selection of available environments, and the user can choose 408 an available environment. In some implementations, once an environment is chosen, a stack can be chosen 425 by the decider or by the user. In other implementations, the environment and the stack can be chosen concurrently (e.g., when only one stack is available). In some implementations, a stack can be chosen prior to the selection of an environment (e.g., when the decider 360 is hard-coded to run a particular type of stack on the host device).

In some implementations, for a given VMM stack, the decider can query the host and see if a compatible VMM or virtualization layer of the appropriate version is pre-installed and whether the user is allowed to run it. If so, the decider can mark the VMM stack as available. If the VMM or virtualization layer is incompatible and precludes the installation of a compatible VMM or virtualization layer, then the decider can mark the VMM stack as unavailable. If the user doesn't have sufficient privileges to initiate or install the VMM or virtualization layer, then the decider can mark the VMM stack as unavailable. Some virtualization layers (e.g., Thinstall and QEMU), do not require administrator privileges to install and or run. In that case, these checks can be avoided.

In one example, the VMware Workstation 6 VMM requires administrator privileges to install and run on a computer. If the user does not have administrator privileges and the VMware Workstation VMM is not pre-installed, then the user will be unable to run a VMM stack based on the VMware workstation VMM. The decider can make this determination by examining the host device OS for an existing version of a VMware workstation VMM that is compatible with the VM in a particular VMM stack. If a compatible VMware workstation is already installed, and the software policy of the host operating system allows the user to run it, then the decider can mark the VMM stack as available. If not, the decider can query the host device OS to see whether the current user has sufficient privileges to install a VMware workstation stack. If the user does have sufficient privileges, then the decider can mark the VMM stack as available. In some implementations, after the decider has marked each stack as available or unavailable, the user can choose any available OS API stack 302 or a VMM stack 301 to run on the host device. In other implementations, the decider can choose an available stack to run on the host device.

If a decider chooses a VMM stack 301, then the virtual machine 315 can be configured to mount environment 340. In some implementations, mounting is accomplished by adding an additional virtual disk containing environment 340 to virtual machine 315. In this case, the virtualization layer 305 should also support reading/writing the virtual disk containing environment 340. In other implementations, a network file system, shared folders system (e.g. VMware Workstation Shared Folders, Virtual PC Shared Folders), virtual CD media, or other system may be used to mount environment 340 by adding the files needed for environment 340 into virtual machine 315. In this case, virtualization layer 305 or host operating system 335 can read/write the individual files of environment 340 using standard OS file system calls. In some implementations, after the virtual machine 315 is configured to mount environment 340, the decider can launch virtual machine 315. In some implementations, after the virtual machine 315 is configured to mount environment 340, the virtual machine 315 can be configured to automatically start virtualization layer 300 and environment 340. In some implementations, if virtual machine 315 is already running, additional environments 340 can be mounted and/or launched in the running virtual machine 315 (e.g., by sending a network request to a service running in the VMM stack that can examine mounted storage for additional environments, and can launch the additional environments).

If a decider chooses an OS API stack 302, then if a virtualization layer 305 is not already running, the decider can start a virtualization layer 305. The decider can then instruct the virtualization layer 305 to run environment 340. In some implementations, the decider can instruct the virtualization layer 305 to resume running an environment 340 (e.g., if the environment 340 was suspended).

The functions of the decider need not all reside in a single module or unit. For example, there could be a plug-in system that allows the decider to be extended to additional types of stacks after compile time. Additionally, in some implementations, the decider can invoke the VMM 320 or the virtualization layer, and the VMM or the virtualization layer can implement the checks that determine whether a stack can run on the host device. Once an environment is selected 408 and a stack is selected 425, the selected environment can be run 409 on the selected stack.

Figure 5:
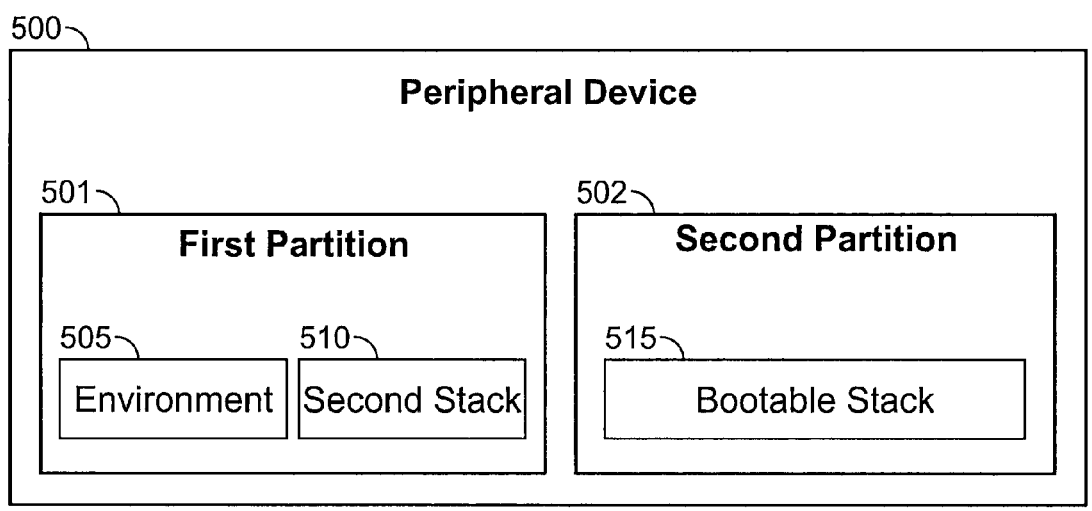
FIG. 5 illustrates an example peripheral device including multiple stacks.

In some implementations, an environment can run a "bootable" stack (e.g., a stack that is "directly on" the hardware of the host device). This can be implemented by booting the host device from a peripheral device containing a bootable stack and at least one environment. For example, the user may trust the hardware of the host device, and not trust the currently installed OS and software on the host device. Since the user trusts the hardware on the host device, the user can allow the hardware to run the software (e.g., a stack and an environment), originating from the peripheral device. In some implementations, the same environment can be accessed from either a stack running on the host operating system or from a second stack on the peripheral device, when the second stack is capable of running on the host device. In some implementations, the same environment can run on any compatible stack (e.g., bootable or non-bootable) on the peripheral device. FIG. 5 illustrates an example peripheral device 500 (e.g., a portable storage device), including a first partition 501 and a second partition 502. The first partition 501 includes an environment 505 and a second stack 510. The second partition 502 includes a bootable stack 515.

In some implementations, the software on peripheral device 500 can run VMs as environments (e.g., booted into a Linux stack or run on a Windows® OS). The storage on peripheral device 500 can be partitioned into a first partition 501 (e.g., a FAT32 partition), and a second partition 502 (e.g., an ext3 partition). An environment 505 (e.g., a VM environment), and a second stack 510 (e.g. a Windows-based VMM stack such as QEmu or VMware Player), can be placed on the first partition 501 (e.g., a FAT32 partition can be used for storing an environment 505 because the FAT32 partition is easily accessible from either a Linux or Windows® OS). A bootable stack 515 (e.g., a bootable Linux stack), can be placed on the second partition 502. For example, a boot loader can be installed on the peripheral device 500. The boot loader can be configured to boot the bootable stack 515 (e.g., the Linux stack), on the second partition 502 (e.g., the ext3 partition). The bootable stack 515, can be configured to mount the first partition 501 (e.g., a FAT32 partition). Once mounted on the first partition 501, the bootable stack 515, can then search for and start VMs found on the first partition 501.

In some implementations, as noted above, a Windows autorun feature can be configured (e.g., by creating an AUTORUN.INF file), to start an environment using a Windows-based VMM stack. Depending on the host configuration, the autorun file can facilitate user interaction with the VM environment. For example, the autorun file can automatically launch a VM environment. In another example, the autorun file can present a list of options including one or more VM environments. The list of options can also include one or more actions the user can implement using the peripheral device (e.g., the option of launching a VM environment).

In one implementation, after the user attaches a peripheral device to a host device (e.g., by inserting the USB stick into the host device), the user can start the host device or restart the host device if the host device is already running. The host device can present an option to the user for selecting a boot device (e.g., by presenting an icon of the peripheral device to the user or by presenting a text menu at boot). The user can select the peripheral device (e.g., the USB stick), as the boot device. After the user selects the peripheral device as the boot device, the BIOS can start a boot loader installed on the peripheral device, and one or more environments (e.g., a VM environment), can be booted from the peripheral device. The boot loader can be configured to boot a bootable stack on the peripheral device. The bootable stack can be configured to mount a partition containing one or more environments and look for an environment to start. Once the bootable stack discovers an environment, the bootable stack can start the environment on the host device.

In one implementation, the BIOS can automatically boot off of the peripheral device. In another implementation, the user can enter the BIOS configuration interface and change the boot order. In another implementation, the user can select a device (e.g., the host device or the peripheral device) to boot from by activating a key at boot-time. In yet another implementation, the user can insert a CD or other bootable device capable of activating the boot loader on the peripheral device.

In some implementations, if a Linux compatibility layer for Windows® exists, a Linux environment can run on the compatibility layer on Windows in one case and run in a bootable Linux stack in the another case. In some implementations, there can be a single partition on the peripheral device. For example, only one partition is needed if the bootable OS supports running from a first partition. In some implementations, multiple stacks can exist on a first partition.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard, a pointing device, e.g., a mouse or a trackball, or a musical instrument including musical instrument data interface (MIDI) capabilities, e.g., a musical keyboard, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, the invention can be embodied in a purpose built device.

What is claimed is:

1. A method comprising:
    detecting a first device being attached to a second device, the first device including one or more environments, two or more stacks, and one or more decider applications, wherein each decider application is capable of executing on one or more operating systems;
    selecting a decider application from the one or more decider applications based on the operating system of the second device;
    launching the selected decider application on the second device;
    the selected decider application collecting a list of two or more stacks, the two or more stacks on the list being located on either the first device or on the second device, and being capable of running on the operating system of the second device;
    the selected decider application collecting a list of environments located on either the first device or on the second device;
    the selected decider application determining which environments from the list of environments are capable of being mounted on which stacks from the list of two or more stacks;
    presenting information which indicates which environments from the list of environments are capable of being mounted on which stacks from the list of two or more stacks;
    receiving a selection of an environment and a stack, wherein the selected environment is capable of being mounted on the selected stack;
    running the selected stack on the operating system of the second device; and
    mounting the selected environment.

2. The method of claim 1, wherein the decider application automatically selects a stack and then collects a list of environments capable of being mounted on the selected stack.

3. The method of claim 1, wherein the first device is a portable device and the second device is a host device.

4. The method of claim 1, wherein the stacks include Virtual Machine Monitor stacks and Operating System Application Program Interface stacks.

5. The method of claim 4, wherein when a Virtual Machine Monitor stack is selected, a Virtual Machine mounts the selected environment.

6. A non-transitory computer-readable storage medium storing instructions that, when executed by a computer, cause the computer to perform a method, the method comprising:
    detecting a first device being attached to a second device, the first device including one or more environments, two or more stacks, and one or more decider applications, wherein each decider application is capable of executing on one or more operating systems;
    selecting a decider application from the one or more decider applications based on the operating system of the second device;
    launching the selected decider application on the second device;
    the selected decider application collecting a list of two or more stacks, the two or more stacks on the list being located on either the first device or on the second device, and being capable of running on the operating system of the second device;
    the selected decider application collecting a list of environments located on either the first device or on the second device;
    the selected decider application determining which environments from the list of environments are capable of being mounted on which stacks from the list of two or more stacks;
    presenting information which indicates which environments from the list of environments are capable of being mounted on which stacks from the list of two or more stacks;
    receiving a selection of an environment and a stack, wherein the selected environment is capable of being mounted on the selected stack;
    running the selected stack on the operating system of the second device; and
    mounting the selected environment.

7. The non-transitory computer-readable storage medium of claim 6, wherein the decider application automatically selects a stack and then collects a list of environments capable of being mounted on the selected stack.

8. The non-transitory computer-readable storage medium of claim 6, wherein the stacks include Virtual Machine Monitor stacks and Operating System Application Program Interface stacks.

9. The non-transitory computer-readable storage medium of claim 8, wherein when a Virtual Machine Monitor stack is selected, a Virtual Machine mounts the selected environment.

10. An apparatus comprising:

a processor;

a detection mechanism configured to detect a first device being attached to a second device, the first device including one or more environments, two or more stacks, and one or more decider applications, wherein each decider application is capable of executing on one or more operating systems;

a selecting mechanism configured to select a decider application from the one or more decider applications based on the operating system of the second device;

a launching mechanism configured to launch the selected decider application on the second device;

wherein the selected decider application collects a list of two or more stacks, the two or more stacks on the list being located on either the first device or on the second device, and being capable of running on the operating system of the second device;

wherein the selected decider application collects a list of environments located on either the first device or on the second device;

wherein the selected decider application determines which environments from the list of environments are capable of being mounted on which stacks from the list of two or more stacks;

a presenting mechanism configured to present information which indicates which environments from the list of environments are capable of being mounted on which stacks from the list of two or more stacks;

a receiving mechanism configured to receive a selection of an environment and a stack, wherein the selected environment is capable of being mounted on the selected stack;

a running mechanism configured to run the selected stack on the operating system of the second device; and a mounting mechanism configured to mount the selected environment.

11. The apparatus of claim 10, wherein the decider application automatically selects a stack and then collects a list of environments capable of being mounted on the selected stack.

12. The apparatus of claim 10, wherein the stacks include Virtual Machine Monitor stacks and Operating System Application Program Interface stacks.

13. The apparatus of claim 12, wherein when a Virtual Machine Monitor stack is selected, a Virtual Machine mounts the selected environment.

* * * * *